(12) United States Patent
McBride et al.

(10) Patent No.: US 7,676,519 B2
(45) Date of Patent: Mar. 9, 2010

(54) METHOD AND SYSTEM FOR RESPONDING TO REQUESTS RELATING TO COMPLEX DATA MAINTAINED IN A STRUCTURED FORM

(75) Inventors: Aaron Joseph McBride, Calabasas, CA (US); Rob Rappaport, Malibu, CA (US); Jeremy Romero, Calabasas, CA (US); Christopher Brennan, Northridge, CA (US); Robert Williams, Pacific Palisades, CA (US)

(73) Assignee: Conversive, Inc., Malibu, CA (US)

( * ) Notice: Subject to any disclaimer, the term of this patent is extended or adjusted under 35 U.S.C. 154(b) by 121 days.

(21) Appl. No.: 11/508,023

(22) Filed: Aug. 22, 2006

(65) Prior Publication Data
US 2006/0282431 A1    Dec. 14, 2006

Related U.S. Application Data

(63) Continuation of application No. 10/705,679, filed on Nov. 10, 2003, now Pat. No. 7,124,142.

(51) Int. Cl.
*G06F 7/00* (2006.01)
*G06F 17/30* (2006.01)

(52) U.S. Cl. .................. 707/739; 707/694; 707/756

(58) Field of Classification Search ............... 707/4
See application file for complete search history.

(56) References Cited

U.S. PATENT DOCUMENTS

| | | |
|---|---|---|
| 5,980,096 A | 11/1999 | Thalhammer-Reyero |
| 6,523,172 B1 | 2/2003 | Martinez-Guerra et al. |
| 6,532,401 B2 | 3/2003 | Tackett et al. |
| 6,826,568 B2 | 11/2004 | Bernstein et al. |

*Primary Examiner*—Greta L Robinson
*Assistant Examiner*—James J Wilcox
(74) *Attorney, Agent, or Firm*—The Webb Law Firm

(57) ABSTRACT

A method and apparatus for processing user entered input and providing a response in a system for autonomously processing requests includes rules. For each rule, whether the input is recognized is determined. If it is, a response is sent to the user. To determine recognized input, the method attempts to match the rule to a pattern. If a match is not found, the input is not recognized. If a match is found, the input is recognized and the response is sent. Alternatively, the input is conditionally recognized and a statement validator is executed which queries structured data to determine if a logic statement evaluates to true. Depending on how the statement evaluates: i) the input is recognized and the response is sent, ii) the structured data is queried again for the next statement validator, or iii) the input is not recognized and the method continues to the next rule.

10 Claims, 6 Drawing Sheets

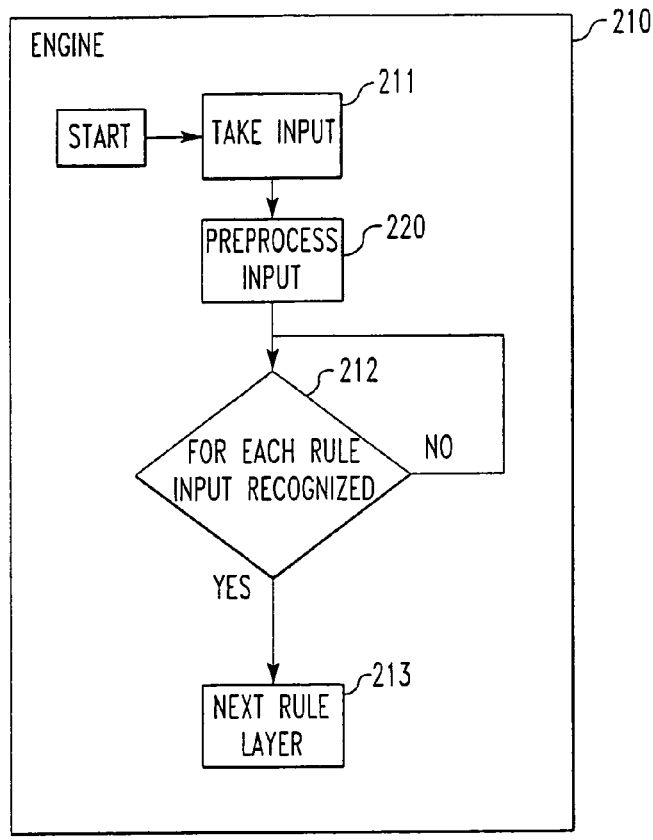
FIG.2.1
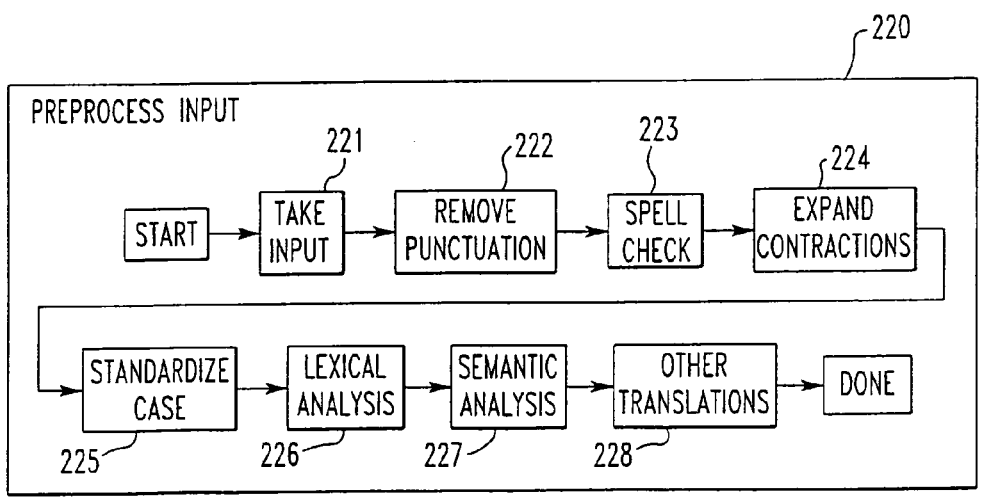
FIG.2.2

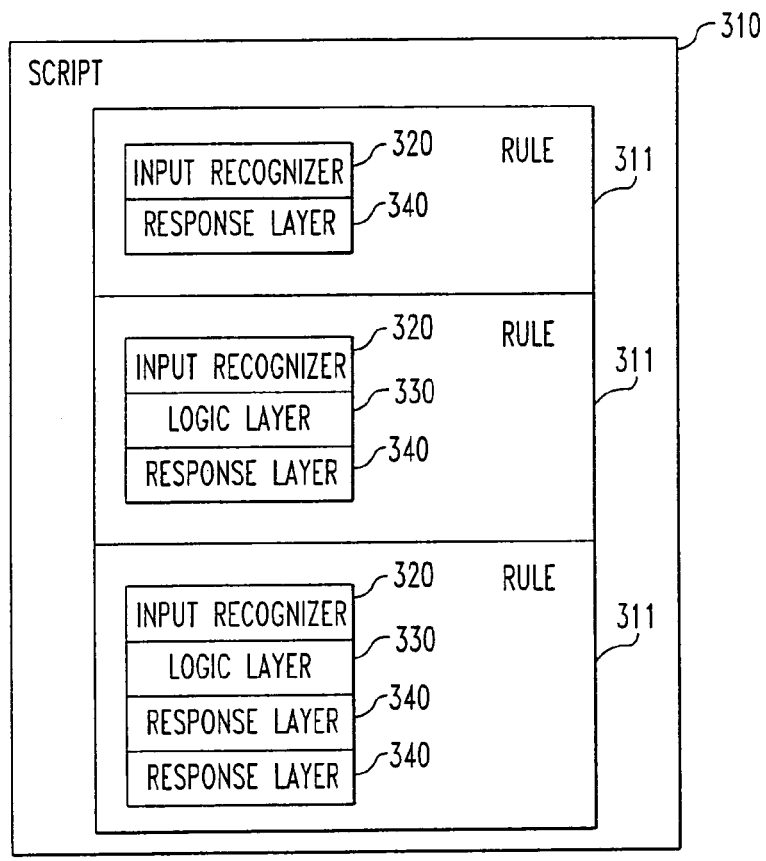
FIG.3.1
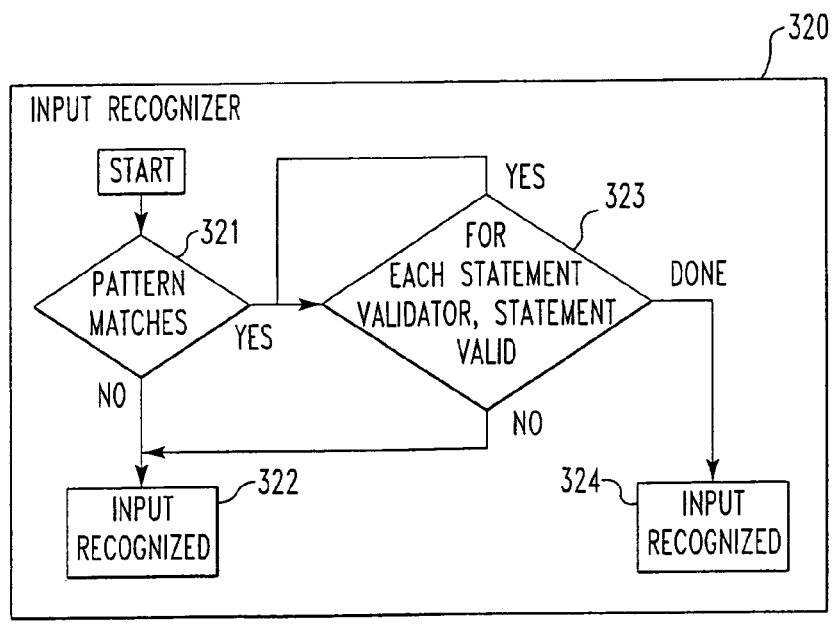
FIG.3.2

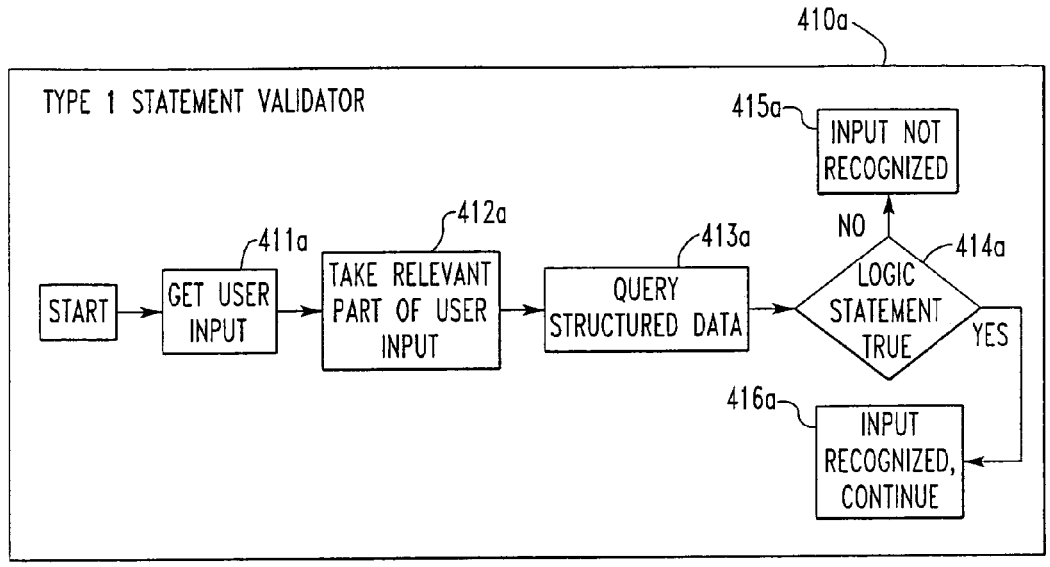
FIG.4.1
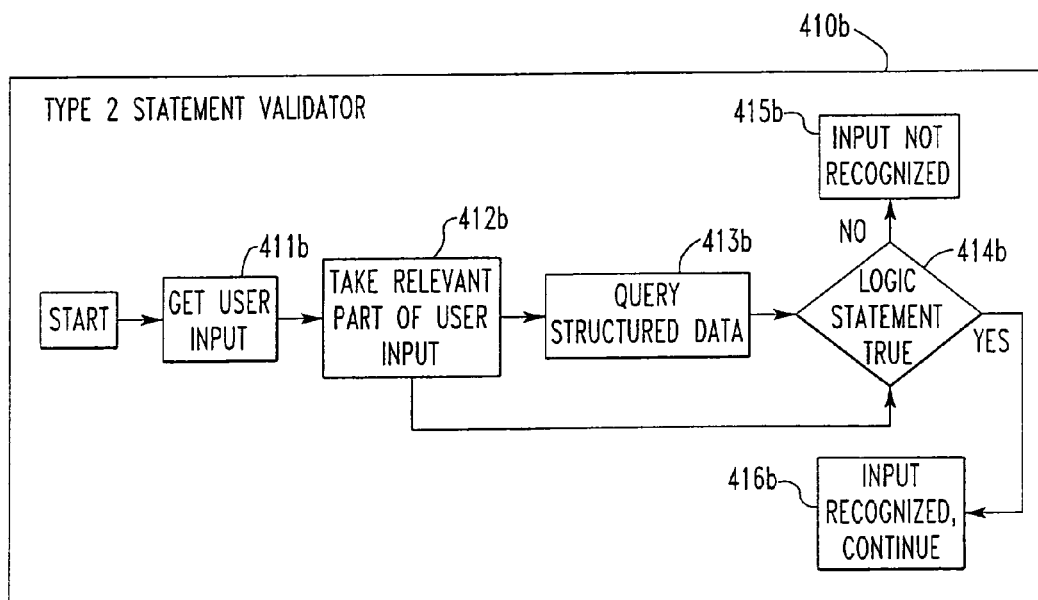
FIG.4.2

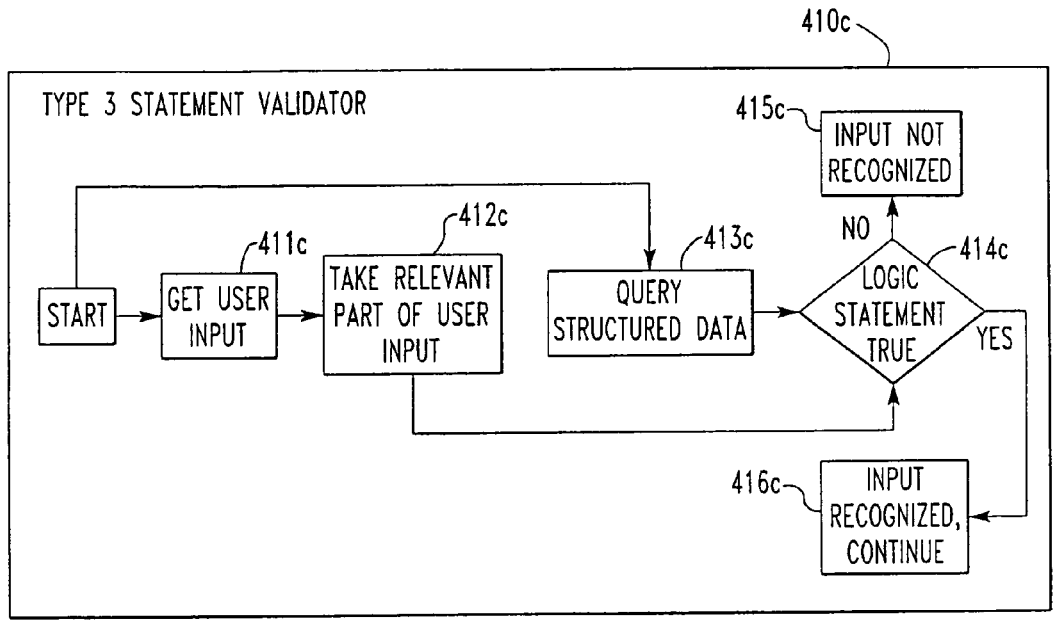
FIG.4.3
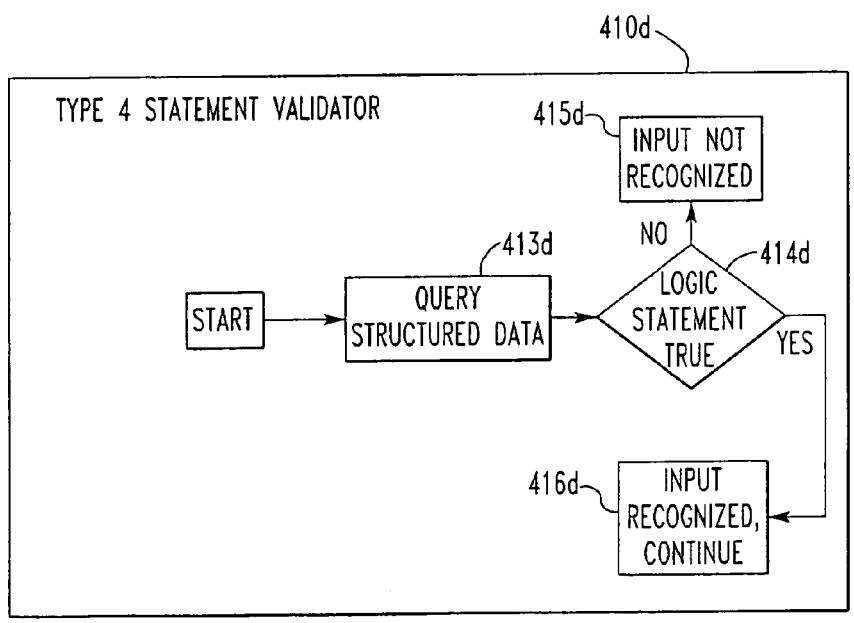
FIG.4.4

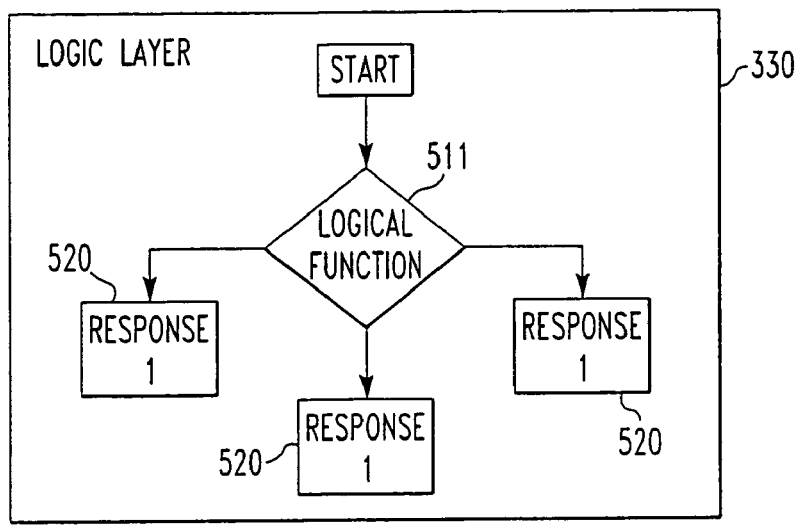
FIG.5.1
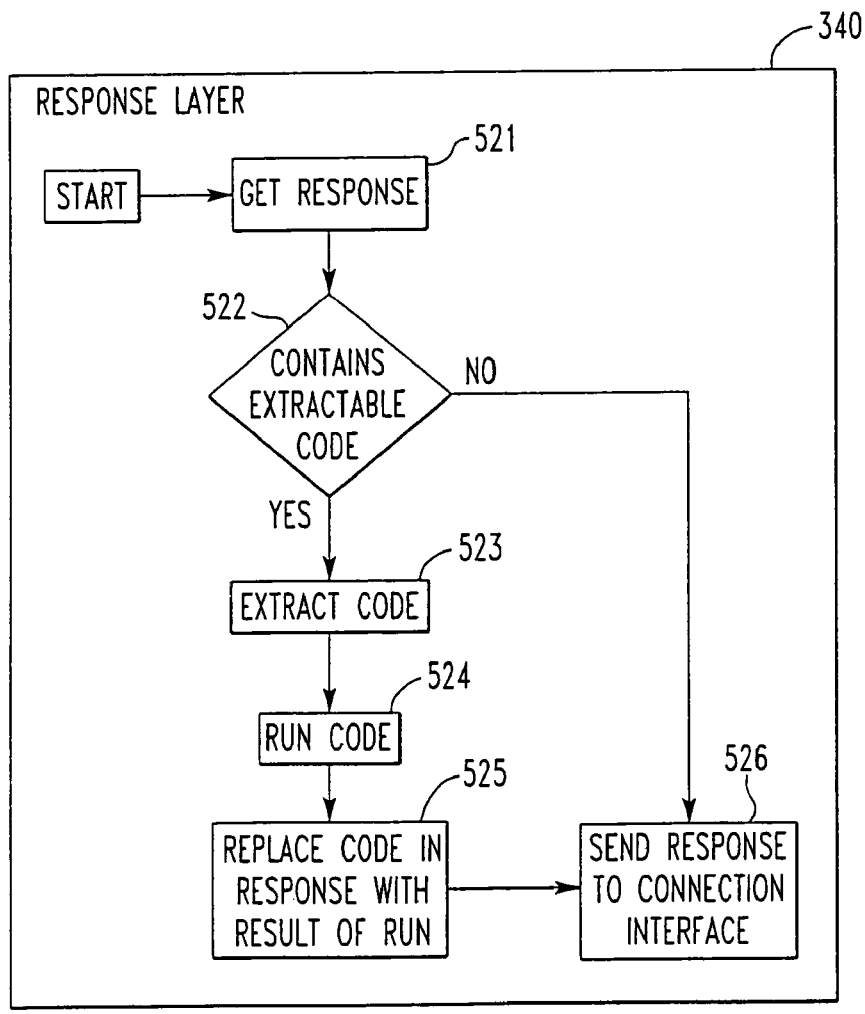
FIG.5.2

METHOD AND SYSTEM FOR RESPONDING TO REQUESTS RELATING TO COMPLEX DATA MAINTAINED IN A STRUCTURED FORM

This application is a continuation application claiming priority to U.S. patent application Ser. No. 10/705,679 entitled "Method and System for Responding to Requests Relating to Complex Data Maintained in a Structured Form," filed Nov. 10, 2003, which is incorporated herein by reference in its entirety.

BACKGROUND OF THE INVENTION

1. Field of the Invention

The present invention is directed to a method and system for autonomously processing requests. More particularly, this invention is directed to a method and system for acting on requests and queries received from users regarding complex data maintained in a structured form.

2. Description of Related Art

For the purposes of the present invention, data maintained in a database, file, or other source of structured and/or tagged data is referred to as "structured data." So called "virtual robots" (or "Bots") are software programs that interact and/or communicate with users (human, machine, or otherwise) and take actions or make responses according to input from these users. "Bot" refers to any program which interacts with a user in some fashion and should not be assumed to refer only to physically embodied robots. "Input" refers to any description of a situation the Bot may encounter; although the most common inputs are textual inputs from users, inputs can be actions taken by users, external circumstances, or even events internal to the Bot such as an internal alarm clock.

A common use of a Bot is as an interface to a web site where the administrator of that site (the "administrator") has programmed the Bot to answer simple inquiries (the "input") that are typically asked by visitors to the site. The Bot finds a pattern, consisting of text and/or code, that best matches the input, and then takes the action that it is programmed to take in connection with that pattern (the "response"). The response can take the form of a text string that contains the information sought by the user (which text string can be transmitted to the user in text form, "read" by a text-to-speech engine, played back to the user as a wave file, or otherwise transmitted to the user in a comprehensible form) or the response can be any other action of which a program is capable, for example, opening a web page, turning a circuit on or off, initiating or ending a program, and the like.

It is desirable that the Bot be scripted to anticipate the inputs that it is likely to receive and the situations that it is likely to encounter. Because users may ask questions or otherwise create inputs in a wide variety of different ways, a large variety of patterns are required to comprehensively anticipate the variety of inputs that the Bot may receive. This complexity is greatly increased by the number of different ways a user may create any particular input. For example, if a user wants to know the name of the president of the Administrator's company, the user may input a text string reading "Who is your President?", "What's the President's name?", or even "Who's the top dog at AdminCo.?"

Historically, Bots have been scripted manually, by having one or more human scripters write patterns for the Bot and tie those patterns to appropriate responses. Such human scripting, although usually necessary, has a number of drawbacks. First, scripting is time-consuming. A typical Bot may contain thousands of possible patterns and responses, all of which need to be scripted. Second, the list of patterns and responses is usually incomplete. It is almost impossible for the scripters to comprehensively cover all possible patterns for a large substantial body of information and desired responses. Furthermore, there is a compound increase in the number of patterns where large bodies of data are involved. For example, the complexity and difficulty of scripting, by hand, patterns that pertain to all the ways a user might input a query about a baseball player's team affiliation, hits, walks, runs, RBI's, batting average, and errors, together with appropriate responses, is very high. This task rapidly becomes insurmountable if, for example, one is trying to script this information by hand for all the baseball players in the major leagues for the past 20 years. The time, expense, and difficulty become very high, as does the opportunity for scripter error and omission. Moreover, as the information changes or is added to over time, the time, expense, and difficulty of maintaining the patterns and responses that refer to the information are very substantial as well. Similar problems are encountered where scripters are faced with a company having a large line of products or a government agency having a large number of employees, assets, or services.

Scripters have tried to work around this problem in a limited way by referring to databases or external software programs (e.g., a search engine, time clock, or weather report) when scripting the responses. This has the advantage of allowing dynamic information to be included in an answer, such that it will change as necessary. However, even this method is of limited utility, because patterns must still be hard coded with all necessary variations to generate the appropriate response. Where users are likely to ask for the information that they want by reference to another piece of data that would itself typically be stored as structured data, for example, the name of a baseball player, a product, or a government employee, properly hard coding appropriate patterns is both daunting initially and expensive to maintain and update.

This process has been eased somewhat by maintaining data about users, such as their address, phone number, stock portfolio, or the like. This is useful in that, when a user inputs a query such as "what is the weather like?", the Bot can assume that the input means "what is the weather like at my address?" and can respond appropriately. Although useful, it will be appreciated that this technique does not obviate the need to disambiguate those items of information that refer not to the user, but to a large amount of data unrelated to the user. For example, if a user's favorite baseball player was Jose Canseco, and this information was maintained in a data field, the technique described in this paragraph could enable the Bot to look in response to the question "How did my favorite ballplayer do today?" for information regarding the baseball player Jose Canseco. However, if the same user input the question "How did Jose Canseco do today?", the same Bot would not know who Jose Canseco was, or even that he was a baseball player, without this information being hard coded into a pattern containing the words "Jose Canseco."

Thus, there is a need in the art to provide a method enabling scripters to be able to create patterns that refer to information that is maintained in a database, file, spreadsheet, or otherwise as structured data, without manually hard coding the structured data itself into the patterns. Additionally, there is a need for a method that acts on requests and queries received from users regarding complex data maintained in a structured form.

BRIEF SUMMARY OF THE INVENTION

It is an object of this invention to provide Bots that include patterns (or text strings) that are written in a very high level language that closely resembles a human natural language and that are intended to anticipate the inputs that may be received from users.

The present invention meets these objectives by providing a variety of mechanisms for referring to structured data. The invention cooperates with an automated interface program designed to interact and communicate with users. The invention executes actions to enable an engine of such program to recognize inputs containing terms that are made available to the engine in the form of structured data.

In various embodiments of the present invention, relevant portions of the input are used either to query the structured data or to test the validity of the logical statement.

Generally, the method according to the present invention includes receiving input, matching the input to a pattern, querying structured data based on instructions contained in a rule containing the pattern, using the result of the structured data inquiry to determine the validity or invalidity of a logical statement, recognizing or not recognizing the input based upon the validity or invalidity of the logical statement, triggering the rule, and generating a response.

More specifically, the present invention is a method for processing input entered by a user and providing at least one response in a system for autonomously processing requests. A set of rules is provided. A user enters an input or a request. For each rule in the set, it is determined whether the input is recognized. If the input is recognized, an appropriate response is sent to the user.

To determine if the input is recognized, the invention attempts to match the input to a pattern contained in a set of patterns scripted to match potential inputs. If no match is found, the input is not recognized and the invention proceeds to the next rule. If a match is found, the input is recognized and the appropriate response is sent or at least one statement validator is executed to determine if a logic statement provided by the statement validator is a valid statement. One or more statement validators may be used.

A statement validator queries structured data to determine if the logic statement is true. If the logic statement is true, the input is recognized and if another statement validator is present, then the structured data is queried again, otherwise the appropriate response is sent. If the logic statement is false, the input is not recognized and the process continues to the next rule.

BRIEF DESCRIPTION OF THE SEVERAL VIEWS OF THE DRAWINGS

FIG. 2.1 is a flow chart of the processes used by an engine of the present invention;

FIG. 2.2 is a flow chart of the processes used by a preprocess input component of an engine of the present invention;

FIG. 3.1 is a schematic drawing of a script and associated component parts of the present invention;

FIG. 3.2 is a flow chart of an input recognizer component of a script of the present invention;

FIG. 4.1 is a flow chart of a statement validator of the present invention;

FIG. 4.2 is a flow chart of another statement validator of the present invention;

FIG. 4.3 is a flow chart of yet another statement validator of the present invention;

FIG. 4.4 is a flow chart of yet another statement validator of the present invention;

FIG. 5.1 is a flow chart of a logic layer component of a script of the present invention; and FIG. 5.2 is a flow chart of a response layer component of a script of the present invention.

DETAILED DESCRIPTION OF THE INVENTION

Figure 1:
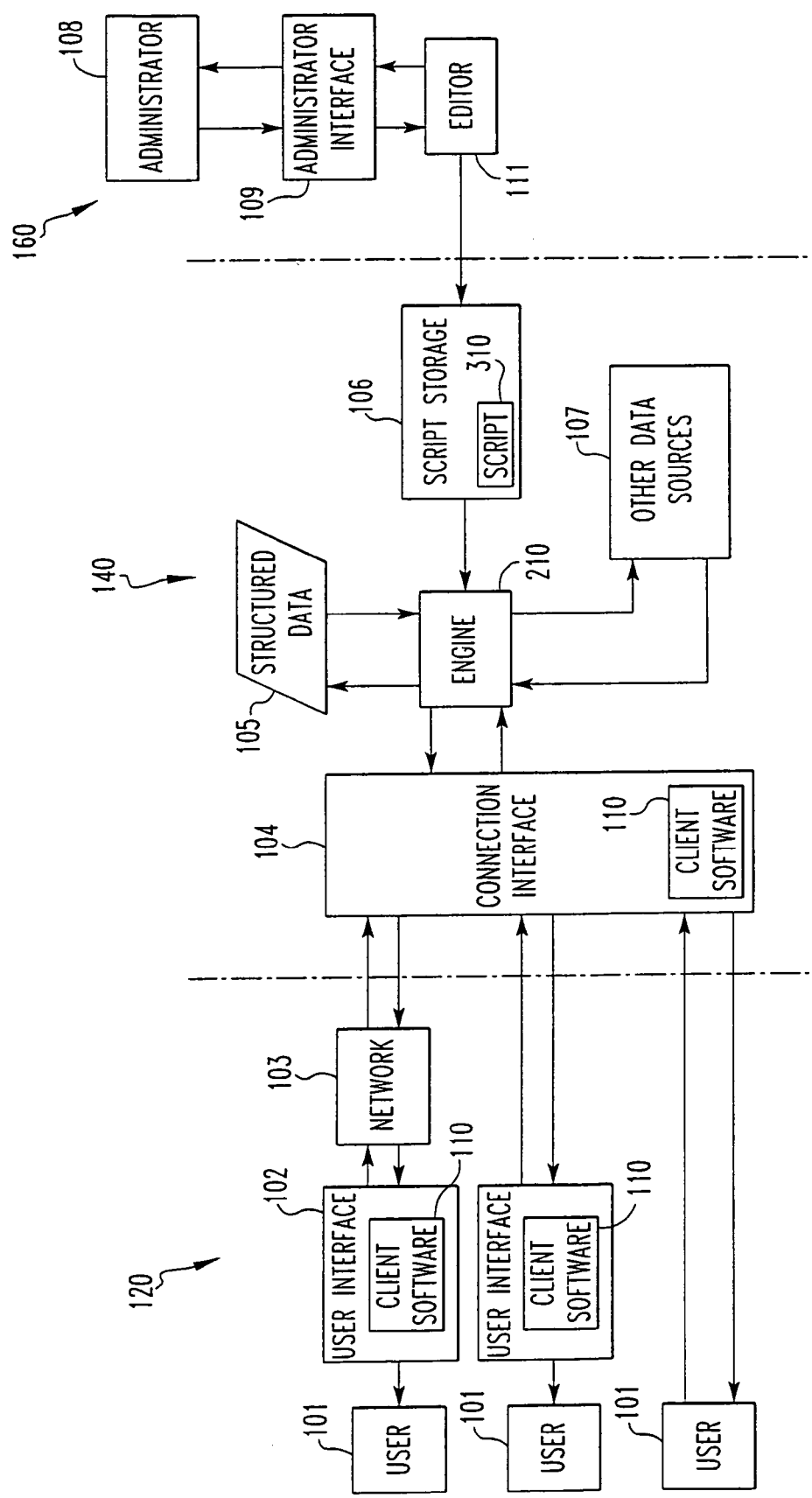
FIG. 1 is a schematic drawing of an operating environment of the present invention.

A complete understanding of the present invention will be obtained from the following description when taken in connection with the accompanying drawing figures wherein like reference characters identify like elements throughout.

The general architecture of the present invention will now be described. Referring to FIG. 1, an operating environment of the present invention is depicted. The environment can be characterized generally into three sections: a front end section 120, a Bot processor section 140, and an administration section 160.

The front end section 120 is generally an environment in which a user 101 interacts with a Bot connection interface 104, possibly via a user interface 102 that may be connected to the Bot connection interface 104 via a network 103. The user interface 102 can be anything capable of receiving human or machine language input, including, without limitation, a computer, a Personal Digital Assistant (PDA), a telephone, or a pager. The user interface 102 will also typically have some form of client software 110 installed to provide a text box, buttons, or other method for the entry of user 101 inputs and some method for displaying intelligible responses from the Bot. The network 103 can be any system capable of transmitting such input over any distance, including, without limitation, a local area network (LAN), the Internet, a "wifi" (wireless fidelity), cellular or other wireless data connection, a virtual private network (VPN), or simply a hard wired telephone system. The user 101 can also simply act directly upon the Bot connection interface 104. In such circumstances (as well as in circumstances such as telephony where the user input will not support client software 110), client software 110 will usually be resident in the Bot connection interface 104 to facilitate user 101 interaction. It will be appreciated that many other means of connection to the Bot processor section 140 are well known to those skilled in the art and that the present invention should not be limited to any particular aspects of the general operating environment as disclosed herein.

In a common use of Bot technology, the user 101 connects to a site where the user interface 102 includes client software 110. The advantage for the site developer is that the user 101 may have a help or information request that is easily handled via a Bot using the client software 110. It is not uncommon to find sites having a list of FAQs (Frequently Asked Questions) which serve the purpose of handling very low level user concerns and questions. However, where there are a substantial number of FAQ's, pointing and clicking through web pages becomes an inefficient method of finding the required information, as does searching with a conventional search engine. Bots provide a more efficient method of obtaining information and of handling more advanced questions or interactions with the site.

In the operating environment of this embodiment of the present invention, the Bot connection interface 104 consists of hardware, an operating system, and any application software necessary to support a Bot engine 210 and enable the Bot engine 210 to receive inputs and send responses in a chosen communications mode. Necessary application software in the Bot connection interface 104 may include an email application, an instant messaging application, an internet relay chat (IRC) application, voice recognition software, or other applications, as necessary, to support the chosen mode or modes of communication between the Bot engine 210 and the user 101. The client software 110, along with structured data 105 and script storage 106, may be resident on the Bot connection interface 104, although these may also be hosted on a remote computer and made available to the Bot engine 210 via a network 103 or other connection.

As the user 101 sends inputs, the Bot engine 210 receives the inputs, processes the inputs, and generates responses. Typically, where the user 101 is human, a two way communications dialogue occurs between the user 101 and the Bot engine 210 in that the user 101 may ask questions, make declarative statements, and perform other normal communications patterns that typify modes of human communications. For the purposes of the present invention, "communications" is intended to be a broad concept. Indeed, suitable communications may be in the form of written or spoken language, graphics, URL's, or the like that may be passed to and from a user and an automatic interface program, such as the present invention.

In turn, the Bot engine 210 accepts the inputs generated by the user 101 and generates responses by processing the inputs according to a script or scripts 310 that are stored in the script storage 106. As will be discussed in greater detail in connection with FIGS. 3.1 and 3.2, the scripts 310 contain rules 311 and are typically created at the administration section 160 as necessary or appropriate for the specific use to which the Bot will be put. For example, if the site using the Bot engine 210 is a site for a reseller of personal computers, then the scripts 310 should be designed to handle questions and discussions concerning personal computers and their peripherals. Thus, the administration section 160 will generate the scripts 310 such that the scripts 310 will guide the discussion concerning many computer-related topics. The scripts 310 are then stored for use by the Bot engine 210, or, alternatively, the scripts 310 may be compiled by a compiler and the compiled code incorporated into an engine (see, for example, U.S. Pat. No. 6,532, 401).

The administration section 160 consists of an administrator 108, an administrator interface 109, and an editor 111. The administrator 108 is the human being who creates the scripts 310 that govern the behavior of the Bot engine 210. Typically, this human being accomplishes this task through the use of the administrator interface 109 that has a text box or boxes or other entry points for the input of patterns, as well as a response or responses associated with that input. The administrator interface 109 may also provide various tools to facilitate the process of inputting the patterns in an organized and efficient way. The editor 111 takes the patterns provided by the administrator 108 and associates them with the appropriate response or responses. The administrator interface 109 and the editor 111 may be created as a single unit or may be designed to reside in separate computers. It will be appreciated by those skilled in the art that the scripts 310 can be written by human administrators or by automated or partially automated script creation tools and that the present invention should not be limited to scripts written by humans or otherwise.

Although FIG. 1 gives a general description of various operating environments in which Bots may exist, it will be appreciated that many other operating environments are obvious to those skilled in the art and that the scope of the present invention should not be so limited to the exemplary descriptions as given above.

The Bot processor section 140 will now be described. FIG. 2.1 provides a detailed depiction of the processes used by the Bot engine 210 according to the present invention. In step 211, inputs are brought to the Bot engine 210 via the Bot connection interface 104, as shown FIG. 1. The Bot engine 210 takes the input in step 211 and then, typically, but not necessarily, preprocesses the input to some degree to enable recognition and added functionality in step 220. Examples of some typical functions that may be contained in the preprocessing of input in step 220 are detailed below. The input is then taken to an input recognizer component 320 of each rule 311 in the script 310, where it is determined for each rule 311 whether the input is recognized, step 212. Step 212 is repeated for each rule 311, for so long as the input is not recognized. Once the input recognizer component 320 of a rule 311 recognizes an input in step 212, the process continues at step 213 to the next layer of the rule 311, which is either a response layer (or routine) 340 or a logic layer 330. Details of the workings of the input recognizer 320, the logic layer 330, and the response layer 340 are provided below in connection with FIGS. 3.2, 5.1, and 5.2

The preprocessing of input, step 220, will now be described. FIG. 2.2 provides a detailed depiction of the processes used by the preprocess input step 220, if utilized, of the Bot engine 210 according to the present invention. The functions contained in the preprocess input step 220 can vary greatly among different Bot designs, depending upon the overall strategy employed by the designer. Typically the preprocess input step 220 is composed of processes that are intended to either: (i) standardize the inputs in some regard in order to reduce the complexity of the input faced by the engine or (ii) extract some level of structure or meaning from the input and embody this as code so that the Bot engine 210 can manipulate or manage it. Examples of the first purpose include a remove punctuation process 222, a spell check process 223, an expand contractions process 224, and a standardize case 225 process. Examples of the second purpose include a lexical analysis process 226, a semantic analysis process 227, and other translation processes 228.

In the embodiment described herein, the preprocess input step 220 begins by taking the input in step 221 and then proceeding to remove punctuation in step 222. Removing the punctuation from a text string removes the ambiguity created by the fact that people punctuate their sentences differently and that some people forget to punctuate at all.

Next the input is spell checked at step 223 so that spelling errors can be removed, further minimizing text variation due to error or variant usage by the user 101.

By proceeding to expand contractions in step 224, the input is further standardized so that the Bot engine 210 can recognize contracted words, for example, "what's" as being identical to its constituent parts "what is", further reducing the complexity of the inputs that the Bot engine 210 must be able to recognize.

The next step 225 standardizes case, allowing the Bot engine 210 to recognize, for example, "the", "The", and "THE" as being identical, and removing as a variable the scheme of capitalization that may have been employed by the user 101.

The input is then passed to lexical analysis in step 226, where processes relating to the meaning of words are performed. As an example, lexical analysis might parse or partition the input to determine those text strings that are synonymous (at least for the administrator's purposes) with other text strings, for example, "I want", "I need", and "Give me". Typically these text strings would be replaced with a text or code string that stands in for them in the input, allowing a single rule 311 to recognize an input phrased in any of these different ways.

Next the input goes through semantic analysis in step 227, which is useful in identifying parts of the sentence, for example, the subject of the sentence, the object of the verb, or the referent of a pronoun. Depending upon the methodologies used, this step can be useful for pattern recognition and/or for maintaining context in a "conversation" between the user 101 and the Bot.

Finally, the input is passed through other translations in step 228, where the other translations are any other processes whereby strings are added to or substituted for portions of the input in order to add functionality to the Bot. These processes may include language translation, substitutions of machine language for natural language, or other methodologies.

Those skilled in the art will readily understand that some or all of the above exemplary processes might be included at this stage in various orders and configurations and that there are other processes of similar purpose that may be undertaken in a Bot suitable for the present invention. Similarly, some or all of these objectives may be achieved by incorporating the functionality into the rules used to recognize inputs.

The recognition of input, step 212, will now be described. FIG. 3.1 depicts the structure of an embodiment of a script 310 and its component parts, suitable for the purposes of the present invention. The script 310 contains one or more rules 311 that are in turn composed of an input recognizer 320 and one or more response layers 340. Some rules 311 may also contain a logic layer 330, enabling them to fire one or more responses of those that are available. The detailed processes of each of these components are described in more detail below. As those skilled in the art will readily understand, there are many different strategies and methods by which the rules 311 can be ordered, grouped, or sorted in order to enhance the speed or accuracy of the Bot engine 210 and that the present invention should not be limited to any particular method or strategy of ordering, grouping, or sorting the rules 311.

The steps of the input recognizer 320 are depicted in more detail in FIG. 3.2. The first step 321 in input recognition is typically the matching of the preprocessed input to a pattern contained in a set of pattern matches of the input recognizer 320. A pattern is a coded text string that represents a set of strings. A string matches a pattern if the string is in the set that the pattern represents. Pattern matching may be accomplished by, for example, regular expressions. As those skilled in the art will also be aware, there are many different languages and protocols in which such pattern matchings are commonly carried out, including, without limitation, Perl, Java, PHP, and others, and that the present invention should not be limited by the use of any particular query, language, or protocol. If there is no match found in the pattern matches, the input will not be recognized and the Bot engine 210 will continue to search for a match in other rules 311. If a pattern match is found, for most Bot engines 210, the rule 311 will then go into effect.

The administrator 108 has the option of creating one or more statement (input) validators 41a-d involving the querying of the structured data 105 which, if true, will result in the successful recognition of the input in step 324 and the effectiveness of the rule 311, and which if false, will provide for the non-recognition of the input in step 322 by the input recognizer 320, with the result that the Bot engine 210 will continue to seek for a matching pattern in other rules 311. Each of these statement validators 41a-d is tested in turn in step 323, for so long as they continue to be valid. If any statement validator 410a-d is invalid, the input is not recognized in step 322. If all are valid, the input is recognized in step 324.

For the purposes of the present invention, four different variations of statement validators 410a-d have been identified. The detailed processes of these four statement validators 410a-d are depicted in FIGS. 4.1, 4.2, 4.3, and 4.4. Each of these four statement validators 410a-d deals with a different method of using the information contained in the input and the information contained in the structured data 105. As those skilled in the art will also be aware, there are many different languages and protocols in which such queries are commonly carried out, including, without limitation, SQL, XQUERY, LDAP, SOAP, and many others, including many that are adapted to specific data sources and uses, and that the present invention should not be limited by the use of any particular query, language, or protocol. It is also important to emphasize that these statement validators 410a-d are not simply a method of querying the structured data 105 to provide elements of a response to an input. Rather, the statement validators 410a-d form an integral part of the input recognition process. If the statement validator 410a-d provides the anticipated result, the input will be considered recognized in step 324 and the rule 311 will be used. If the statement validator 410a-d provides a different result, the input will not-be considered to be recognized in step 322, and the Bot engine 210 will continue on to other rules 311 in search for a match.

The first type of statement validator 410a (type 1 statement validator) is depicted in detail in FIG. 4.1. This type of statement validator 410a uses a relevant string or strings of input to query the structured data 105 and then finds a logical statement to be true or false based upon the result. In this process the first step 411a is to obtain the user's input. Next, the statement validator 410a takes the relevant part of the input in step 412a. This will typically be a text string, the position and extent of which is determined by code that is written into the rule 311. The text string is used to query the structured data 105 in step 413a, using any of the many queries that those skilled in the art will understand to be available to query the structured data 105. The result of the query is then used to determine whether a specific logic statement is true or false in step 414a. Depending upon the result, either the process will continue in stop 416a through the rest of the input recognition process 320 or the input will be considered not to be recognized at step 415a, and the Bot engine 210 will go on to the next rule 311 (FIG. 2 at step 203).

An example of an input recognizer 320 that uses the type 1 statement validator 410a (FIG. 4.1 just described) is as follows:

--- input: "Is Barry Bonds a baseball player?"
input recognizer:
1) get pattern "*is (playername) a baseball player*" (where (playername) is not required to match anything)
2) get input "Is Barry Bonds a baseball player?"
3) pattern matches
statement validator type 1:
4) statement validator: get input
5) extract relevant part of input (playername = "Barry Bonds")
6) run query "select COUNT(playerid) from PLAYERS where name='(playername)'"
7) run logic statement "result[0] == 1"
8) statement true
9) continue

---

If the logic statement is true, then there is one "Barry Bonds", so the rule can be used. Had the statement not been true, the input would not be recognized at step 415a, and the Bot engine 210 would have continued to the next rule 311 at step 203. The next rule 311 might be identical, but for the fact that the logic statement tests "result[0]=0", with the result that it would successfully identify the input where "Barry Bonds" is not, in fact, the name of a baseball player contained in the structured data 105.

The second type of statement validator 410b (type 2 statement validator) is depicted in detail in FIG. 4.2. This type of statement validator 410b uses a relevant string or strings of input to query the structured data 105 and then finds a logical statement to be true or false based upon both the result of the query and the use of the relevant input string itself. In this process the first step is to obtain the user's input in step 411b. Next, the statement validator 410b takes the relevant part of the input in step 412b. This will typically be a text string, the position and extent of which is determined by code that is written into the rule 311. The text string is used to query the structured data 105 in step 413b, using any of the many queries that those skilled in the art will understand to be commonly used to query the structured data 105. The result of the query is then used, together with the relevant part of the input from step 412b to determine whether a specific logic statement is true or false in step 414b. Depending upon the result, either the process will continue at step 416b through the rest of the input recognition process 320 or the input will be considered not to be recognized at step 415b, and the Bot engine 210 will go on to the next rule 311 (FIG. 2 at step 203).

An example of an input recognizer 320 that uses the type 2 statement validator 410b (FIG. 4.4 just described) is as follows. Please note that this example first uses two iterations of the type 1 statement validator 410a (FIG. 4.1) as well.

```
input: "Is Barry Bonds a Dodger?"
input recognizer:
1) get pattern "*is (playername) a (teamname)*" (where (playername)
   and (team name) are not required to match anything)
2) get input "Is Barry Bonds a Dodger?"
3) pattern matches,
statement validator type 1:
4) statement validator: get input
5) extract relevant part of input (playername = "Barry Bonds")
6) run query "select COUNT(playerid) from PLAYERS where
   name='(playername)'"
7) run logic statement "result[0] == 1"
8) statement true
9) continue
statement validator type 1:
10) statement validator: get input
11) extract relevant part of input (teamname = "Dodger")
12) run query "select COUNT(teamid) from TEAMS where
    name='(teamname)'"
13) run logic statement "result[0] == 1"
14) statement true
15) continue
statement validator type 2:
16) statement validator: get input
17) extract relevant part of input (playername = "Barry Bonds")
18) extract relevant part of input (teamname = "Dodger")
19) run query "select teams.name from TEAMS, PLAYERS where
    players.name='(playername)' and players.teamid=teams.teamid"
20) run logic statement "result[0] == (teamname)"
21) statement false
22) input not recognized
```

In this example, the input recognizer 320 first uses two type 1 statement validators 410a (FIG. 4.3) to establish that the relevant parts of the input refer to a player and a team name, respectively. If, for example, the input had not read "Is Barry Bonds a Dodger?", but "Is Barry Bonds a shortstop?", the second of the two type 1 statement validators 410a (initiating at line 10 above) would have returned a negative result, the input would not be recognized at step 415b, and the engine would go on to the next rule 311 (FIG. 2.1 step 213). In the present example, the input recognizer continued at step 416b to the type 2 statement validator 410a. Here the logic statement is false. The player name "Barry Bonds" is not associated with the team name "Dodgers" in our structured data 105. Had the statement been true, the process would have continued at step 416b with the rule 311. Because the statement is not true, the input is not recognized in step 415b, and the Bot engine 210 continues to the next rule 311 (FIG. 2.1 step 213). The next rule 311 could be designed to be the same, but for the fact that the next rule 311 exhibits recognition where the logic statement is false, not true.

The third type of statement validator 410c (type 3 statement validator) is depicted in detail in FIG. 4.3. This type of statement validator 410c queries the structured data 105 without using a relevant string or strings of input and then finds a logical statement to be true or false based upon both the result of the query and the use of a relevant input string. The statement validator 410c queries the structured data 105 in step 413c, using any of the many queries that those skilled in the art will understand to be commonly used to query the structured data 105, but without using any part of the input. At the same time, the statement validator 410c obtains the user's input in step 411c. The statement validator 410c takes the relevant part of the input in step 412c. This will typically be a text string, the position and extent of which is determined by code that is written into the rule 311. The result of the query is then used, together with the relevant part of the input in step 412c to determine whether a specific logic statement is true or false in step 414c. Depending upon the result, either the process will continue at step 416c through the rest of the input recognition process 320 or the input will be considered not to be recognized in step 415c, and the Bot engine 210 will go on to the next rule 311 (FIG. 2 step 203).

An example of an input recognizer 320 that uses the type 3 statement validator 410c (FIG. 4.3) just described is as follows. Please note that the example used is the same as the type 1 statement validator 410a (FIG. 4.1) above, providing a different method for accomplishing the same result.

```
input: "Is Barry Bonds a baseball player?"
input recognizer:
1) get pattern "*is (playername) a baseball player*" (where (playername)
   is not required to match anything)
2) get input "Is Barry Bonds a baseball player?"
3) pattern matches,
statement validator type 3:
4) statement validator: get input
5) extract relevant part of input (playername = "Barry Bonds")
6) run query "select name from PLAYERS"
7) run logic statement "result contains (playername)"
8) statement true
9) continue
```

If the logic statement is true, then there is at least one "Barry Bonds" who is a baseball player, so the input is recognized and the process continues at step 416c to execute the rule 311. Had the statement not been true, the input would not be recognized in step 415c, and the Bot engine 210 would have continued to the next rule 311 (FIG. 2.1 step 213). The next rule 311 might be identical, but for the fact that the logic statement tests "result does not contain [playername]" with the result that it would successfully identify the input where "Barry Bonds" is not, in fact, the name of a baseball player contained in the structured data 105.

A fourth type of statement validator 410d (type 4 statement validator) is depicted in detail in FIG. 4.4. This type of statement validator 410d queries the structured data 105 without using a relevant string or strings of input and then finds a logical statement to be true or false based upon the result of the query. The statement validator 410d queries the structured data 105 in step 413d, using any of the many queries that those skilled in the art will understand to be commonly used to query the structured data 105, but without using any part of the input. Note that this may mean that the information that would be provided by obtaining part of the input is instead made part of the query string that is part of the coding of the input recognizer 320. The result of the query is then used to determine whether a specific logic statement is true or false in step 414d. Depending upon the result, either the process will continue at step 416d through the rest of the input recognition process 320 or the input will be considered not to be recognized in step 415d, and the Bot engine 210 will go on to the next rule 311 (FIG. 2 step 203).

An example of an input recognizer 320 that uses the type 4 statement validator 410d (FIG. 4.4 just described) is as follows.

```
input: "Do you have stats for last year?"
input recognizer:
1) get pattern "*Do you have stats for last year*"
2) get input "Do you have stats for last year?"
3) pattern matches,
statement validator type 4:
4) run query "select * from PLAYERSTATS where year = 2002"
7) run logic statement "result != false" (result is not empty)
8) statement true
9) continue
```

If the logic statement is true, then there are statistics for 2002, so the input is recognized and the process continues at step 416d to execute the rule 311. Had the statement not been true, the input would not be recognized in step 415d, and the Bot engine 210 would have continued to the next rule 311 (FIG. 2.1 step 213). The next rule might be identical, but for the fact that the logic statement tests "result=false" with the result that it would successfully recognize the input and continue in step 416d where there are, in fact, no statistics for the year 2002 in the structured data 105.

As demonstrated, there can be any number of statement validators 410a-d that work with pattern matches 321 in the input recognizer 320 or none at all. Upon completion of pattern matches 321 and validation 323 of the statement validators 410a-d, if any, contained in the input recognizer, the input is ultimately recognized 324 or not recognized 322. If recognized 324, the process continues to the next layer of the rule 311, whether that is a response layer 340 that generates a response to be transmitted to the user or a logic layer 330 that chooses between the various responses to be used in the response layer 340.

Those skilled in the art will readily understand that the steps of the input recognizer 320 might occur in various orders (or contemporaneously with each other) and configurations and that there are other processes of similar purpose that may be undertaken in a Bot suitable for the present invention.

The generation of responses will now be described. The next step in the execution of a rule 311 following recognition of an input at step 324 by the input recognizer 320 is typically to go to a response layer 340 (FIG. 5.2), the purpose of which is to obtain and prepare the appropriate response to the user's input. A typical data flow for a response layer 340 simply involves getting the response in step 521 and sending it to the connection interface in step 526. A response can typically consist of (i) text, (ii) code to be run in the user interface 102, and/or (iii) code to be extracted and run locally before sending the response to the Bot connection interface 104. The response may consist entirely of text, where this is appropriate. However, more complexity and functionality can be provided by adding code to the response. The use of code allows for dynamic information to be added to the answer and is typically used for frequently changing information, such as the time, stock quotes, weather, or the like. Most typically, the code is non-extractable and is sent to the Bot connection interface 104 in step 526, to be sent to and run in the user interface 102, bringing a web page, running a java applet, or taking some other action that brings the required information to the user 101. Where it is desirable to embed the information provided by running the code in the response, the response is determined to contain extractable code in step 522, the code is extracted in step 523, and the code is run locally in step 524, so that the dynamic information required is embedded in the response in step 525 before transmission to the Bot connection interface 104 in step 526.

A rule 311 can also be designed to employ a logic layer 330 as shown in FIG. 5.1. The purpose of the logic layer 330 is neither input recognition 320, nor response generation, but rather the choosing of an appropriate response upon recognition of an input. This is accomplished by the use of a logical function in step 511. The logical function step 511 may result in a random choice of responses, choosing responses in rotation, or choosing the proper response after appeal to some outside piece of information 107 (for example, the time) or after querying the structured data 105 using simple queries and/or any of the statement validators 410a-d described herein. In this case, the truth or falsity of the logical statement in step 414a-d in the statement validator 410a-d would result in a choice in step 511 between two or more different results (responses) in step 520. It is important to distinguish between such a choice between results in step 511, and the above-described function of the statement validator 410a-d, so as to enable an input recognizer 320 to either recognize or not recognize an input.

The present invention enables scripters to create patterns that refer to information that is maintained in a database, file, spreadsheet, or otherwise as structured data, without manually hard coding the structured data itself into the patterns. Additionally, the present invention efficiently acts on requests and queries received from users regarding complex data maintained in a structured form. This results in the ability to use complex data, in real time, using fewer rules, which, in turn, results in a dramatically faster and more powerful engine.

It will be understood by those skilled in the art that while the foregoing description sets forth in detail preferred ordering of steps of the various processes, other ordering of the steps are contemplated by the present invention.

It will be understood by those skilled in the art that while the foregoing description sets forth in detail preferred embodiments of the present invention, modifications, additions, and changes might be made thereto without departing from the spirit and scope of the invention.

The invention claimed is:

1. A system for processing input entered by a user and providing at least one response for autonomously processing the input, the system comprising:
   a computer having a computer readable storage medium having stored thereon instructions which, when executed by a processor of the computer, causes the processor to perform the steps of:
   (a) providing rules,
   (b) receiving the input entered by the user, wherein the input includes questions or declarative statements;
   (c) processing the input after the input is entered by the user, wherein the step of processing the input includes the step of extracting structure and meaning from the input and the step of standardizing the input, wherein the step of extracting structure and meaning from the input is accomplished using one or more of a lexical analysis process and a semantic analysis process, and for each rule:
(i) determining if the input is recognized via an input recognizer, and
(ii) if the input is recognized, sending an appropriate response to the user, wherein the step of determining if the input is recognized, includes the steps of:
(1) attempting to match the input to at least one pattern,
(2) if no match is found, not recognizing the input and continuing to the next rule, and
(3) if a match is found, either:
(a) recognizing the input, identifying logic within the rule, executing the logic by choosing the appropriate response from a set of responses, and continuing to the step of sending the appropriate response via a response layer, wherein the step of sending the appropriate response includes the steps of:
(i) extracting executable code from the appropriate response, and
(ii) running the executable code to embed dynamic information in the appropriate response;
or
(b) conditionally recognizing the input and executing at least one statement validator to determine if the input is appropriately matched by the rule, wherein execution of the at least one statement validator includes the steps of:
(i) querying structured data to determine if a logic statement evaluates to true, via a logic layer,
(ii) depending upon whether the statement evaluates to true or false, either:
(a) recognizing the input, identifying logic within the rule, executing the logic by choosing the appropriate response from a set of responses, and continuing to the step of sending the appropriate response via the response layer, or
(b) repeating the step of querying the structured data for the next statement validator, if available, or
(c) not recognizing the input and continuing to the next rule.

2. The system according to claim 1, wherein the step of choosing the appropriate response is achieved by randomly choosing from the set of responses.

3. The system according to claim 1, wherein the step of choosing the appropriate response is based upon a query of outside information.

4. The system according to claim 1, wherein the step of choosing the appropriate response is based upon a query of the structured data.

5. The system according to claim 1, further including:
client software configured to receive the input from the user; and
a connection interface in communication with the client software and an engine configured to process and receive the input.

6. The system according to claim 5, wherein the connection interface includes the client software.

7. The system according to claim 5, further including a user interface in communication with the connection interface and including the client software.

8. The system according to claim 7, further including a network interconnecting the connection interface and the user interface.

9. The system according to claim 5, further including other data sources utilizable by the engine to identify a response.

10. A method for processing input entered by a user and providing at least one response for autonomously processing the input, the method comprising the steps of:
providing a computer having a computer readable storage medium having stored thereon instructions which, when executed by a processor of the computer, causes the processor to perform the steps of:
(a) providing rules,
(b) receiving the input entered by the user, wherein the input includes questions or declarative statements;
(c) processing the input after the input is entered by the user, wherein the step of processing the input includes the step of extracting structure and meaning from the input and the step of standardizing the input, wherein the step of extracting structure and meaning from the input is accomplished using one or more of a lexical analysis process and a semantic analysis process, and for each rule:
(i) determining if the input is recognized via an input recognizer, and
(ii) if the input is recognized, sending an appropriate response to the user, wherein the step of determining if the input is recognized, includes the steps of:
(1) attempting to match the input to at least one pattern,
(2) if no match is found, not recognizing the input and continuing to the next rule, and
(3) if a match is found, either:
(a) recognizing the input, identifying logic within the rule, executing the logic by choosing the appropriate response from a set of responses, and continuing to the step of sending the appropriate response via a response layer, wherein the step of sending the appropriate response includes the steps of:
(i) extracting executable code from the appropriate response, and
(ii) running the executable code to embed dynamic information in the appropriate response;
or
(b) conditionally recognizing the input and executing at least one statement validator to determine if the input is appropriately matched by the rule, wherein execution of the at least one statement validator includes the steps of:
(i) querying structured data to determine if a logic statement evaluates to true, via a logic layer,
(ii) depending upon whether the statement evaluates to true or false, either:
(a) recognizing the input, identifying logic within the rule, executing the logic by choosing the appropriate response from a set of responses, and continuing to the step of sending the appropriate response via the response layer, or
(b) repeating the step of querying the structured data for the next statement validator, if available, or
(c) not recognizing the input and continuing to the next rule.

* * * * *